US010915341B2

(12) United States Patent
Lawrence

(10) Patent No.: US 10,915,341 B2
(45) Date of Patent: Feb. 9, 2021

(54) COMPUTER ARCHITECTURE FOR PROCESSING CORRELITHM OBJECTS USING A SELECTIVE CONTEXT INPUT

(71) Applicant: Bank of America Corporation, Charlotte, NC (US)

(72) Inventor: Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 458 days.

(21) Appl. No.: 15/938,105

(22) Filed: Mar. 28, 2018

(65) Prior Publication Data

US 2019/0303183 A1 Oct. 3, 2019

(51) Int. Cl.
*G06F 9/455* (2018.01)
*G06N 7/06* (2006.01)
*G06F 16/901* (2019.01)

(52) U.S. Cl.
CPC ........ *G06F 9/45508* (2013.01); *G06F 16/902* (2019.01); *G06N 7/06* (2013.01)

(58) Field of Classification Search
CPC .............. G06F 9/45508; G06F 16/902; G06F 3/04842; G06F 16/583; G06F 16/2462; G06N 7/06; G06N 20/20; G06N 5/022; G06N 20/00; G06K 9/00926; G06K 9/00536; H04N 19/14; H04N 21/2362; H04N 21/4524; C12Q 1/6886; G01C 21/20; A61B 17/425
See application file for complete search history.

(56) References Cited

U.S. PATENT DOCUMENTS 5,946,673 A 8/1999 Francone et al.
6,167,391 A 12/2000 Lawrence
(Continued)

OTHER PUBLICATIONS

Meersman, R., et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4. 2005, pp. 763-779.

(Continued)

*Primary Examiner* — Kandasamy Thangavelu
(74) *Attorney, Agent, or Firm* — Michael A. Springs

(57) ABSTRACT

A device configured to emulate a correlithm object processing system comprises a memory and one or more processors. The memory stores a mapping table that includes multiple context value entries, multiple corresponding source value entries, and multiple corresponding target value entries. Each context value entry includes a correlithm object. The one or more processors receive at least one input source value and a context input value. The one or more processors identify a context value entry from the mapping table that matches the context input value based at least in part upon n-dimensional distances between the context input value and each of the context value entries. The one or more processors identify a portion of the source value entries corresponding to the identified context value entry, and further identifies a source value entry that matches the input source value. The one or more processors identify a target value entry corresponding to the identified source value entry.

20 Claims, 10 Drawing Sheets

(56) References Cited

U.S. PATENT DOCUMENTS

| | | | |
|---|---|---|---|
| 6,353,930 B1* | 3/2002 | Shimoji | H04N 21/2362 |
| | | | 725/110 |
| 6,941,287 B1 | 9/2005 | Vaidyanathan et al. | |
| 6,943,686 B2 | 9/2005 | Allen | |
| 6,947,913 B1 | 9/2005 | Lawrence | |
| 7,015,835 B2 | 3/2006 | Lawrence et al. | |
| 7,031,969 B2 | 4/2006 | Lawrence et al. | |
| 7,246,129 B2 | 7/2007 | Lawrence et al. | |
| 7,310,622 B2 | 12/2007 | Lawrence et al. | |
| 7,349,928 B2 | 3/2008 | Lawrence et al. | |
| 7,564,994 B1* | 7/2009 | Steinberg | G06F 16/583 |
| | | | 382/118 |
| 9,866,874 B2* | 1/2018 | Lee | H04N 19/14 |
| 2010/0036192 A1* | 2/2010 | Yao | G16H 70/20 |
| | | | 600/33 |
| 2011/0310975 A1* | 12/2011 | Henry | H04N 19/14 |
| | | | 375/240.24 |
| 2013/0013322 A1* | 1/2013 | Fuchs | G10L 19/002 |
| | | | 704/500 |
| 2013/0013661 A1* | 1/2013 | Inakoshi | G01C 21/20 |
| | | | 708/442 |
| 2014/0119430 A1* | 5/2014 | Matsunobu | H04N 19/61 |
| | | | 375/240.02 |
| 2015/0220249 A1* | 8/2015 | Snibbe | G06F 3/04842 |
| | | | 715/719 |
| 2017/0022571 A1* | 1/2017 | Malafa | C12Q 1/6886 |
| 2017/0262552 A1* | 9/2017 | Noma | G06N 20/00 |
| 2018/0089531 A1* | 3/2018 | Geva | G06K 9/00536 |
| 2018/0101742 A1* | 4/2018 | Burge | G06K 9/00926 |
| 2019/0130248 A1* | 5/2019 | Zhong | G06F 16/2462 |
| 2019/0174194 A1* | 6/2019 | Wirasinghe | H04N 21/4524 |

OTHER PUBLICATIONS

Lawrence, P. N., "Correlithm Object Technology," Apr. 2004, 229 pages.

* cited by examiner

COMPUTER ARCHITECTURE FOR PROCESSING CORRELITHM OBJECTS USING A SELECTIVE CONTEXT INPUT

TECHNICAL FIELD

The present disclosure relates generally to computer architectures for emulating a processing system, and more specifically to computer architectures for emulating a correlithm object processing system using a selective context input.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

FIGS. 1-5 describe various embodiments of how a correlithm object processing system may be implemented or emulated in hardware, such as a special purpose computer. FIGS. 6-9 illustrate embodiments of various mapping tables used by the correlithm object processing system. FIG. 10 illustrates a process executed by the correlithm object processing system.

Figure 1:
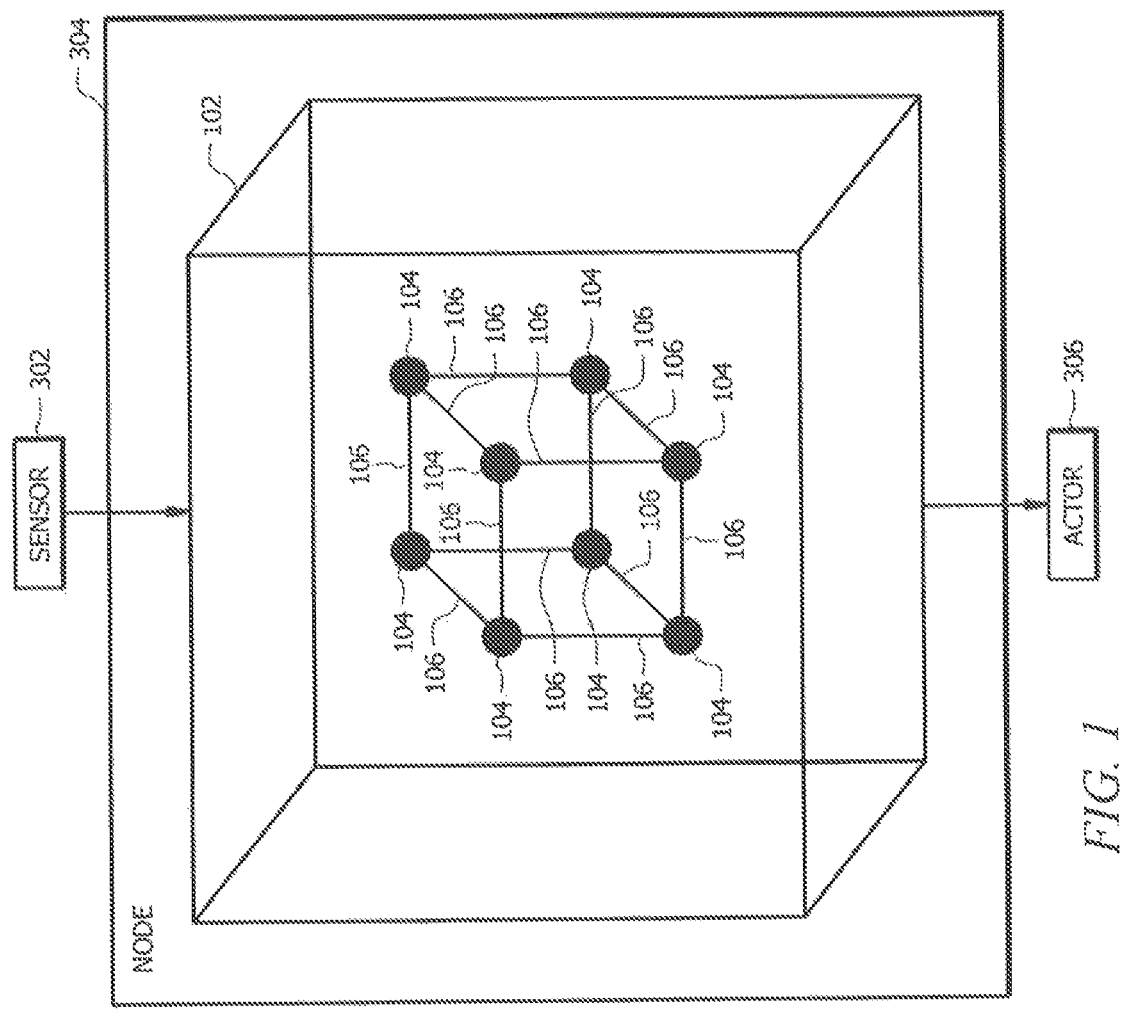
FIG. 1 is a schematic view of an embodiment of a special purpose computer implementing correlithm objects in an n-dimensional space.
Figure 1:
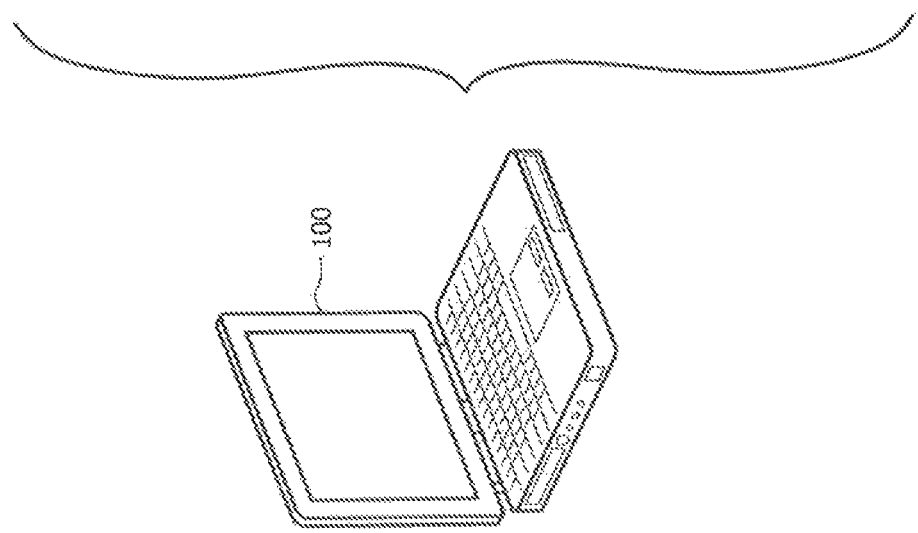

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each others is unique and distinct from conventional computers that can only perform binary comparisons to identify exact matches.

The user device's 100 ability to perform non-binary comparisons of data samples also fundamentally changes traditional data searching paradigm. For example, conventional search engines rely on finding exact matches or exact partial matches of search tokens to identify related data samples. For instance, conventional text-based search engines are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with those people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space," The value of 'n' represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results, increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance or any other suitable technique.

As an example, using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. In other words, the Hamming distance between the first correlithm object 104 and the second correlithm object 104 can be computed as follows:

```
  1001011011
  1000011011
  ----------
  0001000000
```

In this example, the Hamming distance is equal to one because only one bit differs between the first correlithm object 104 and the second correlithm object. As another example, a third correlithm object 104 is represented by a third 10-bit string (0110100100). In this example, the Hamming distance between the first correlithm object 104 and the third correlithm object 104 can be computed as follows:

```
  1001011011
  0110100100
  ----------
  1111111111
```

The Hamming distance is equal to ten because all of the bits are different between the first correlithm object 104 and the third correlithm object 104. In the previous example, a Hamming distance equal to one indicates that the first correlithm object 104 and the second correlithm object 104 are close to each other in the n-dimensional space 102, which means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
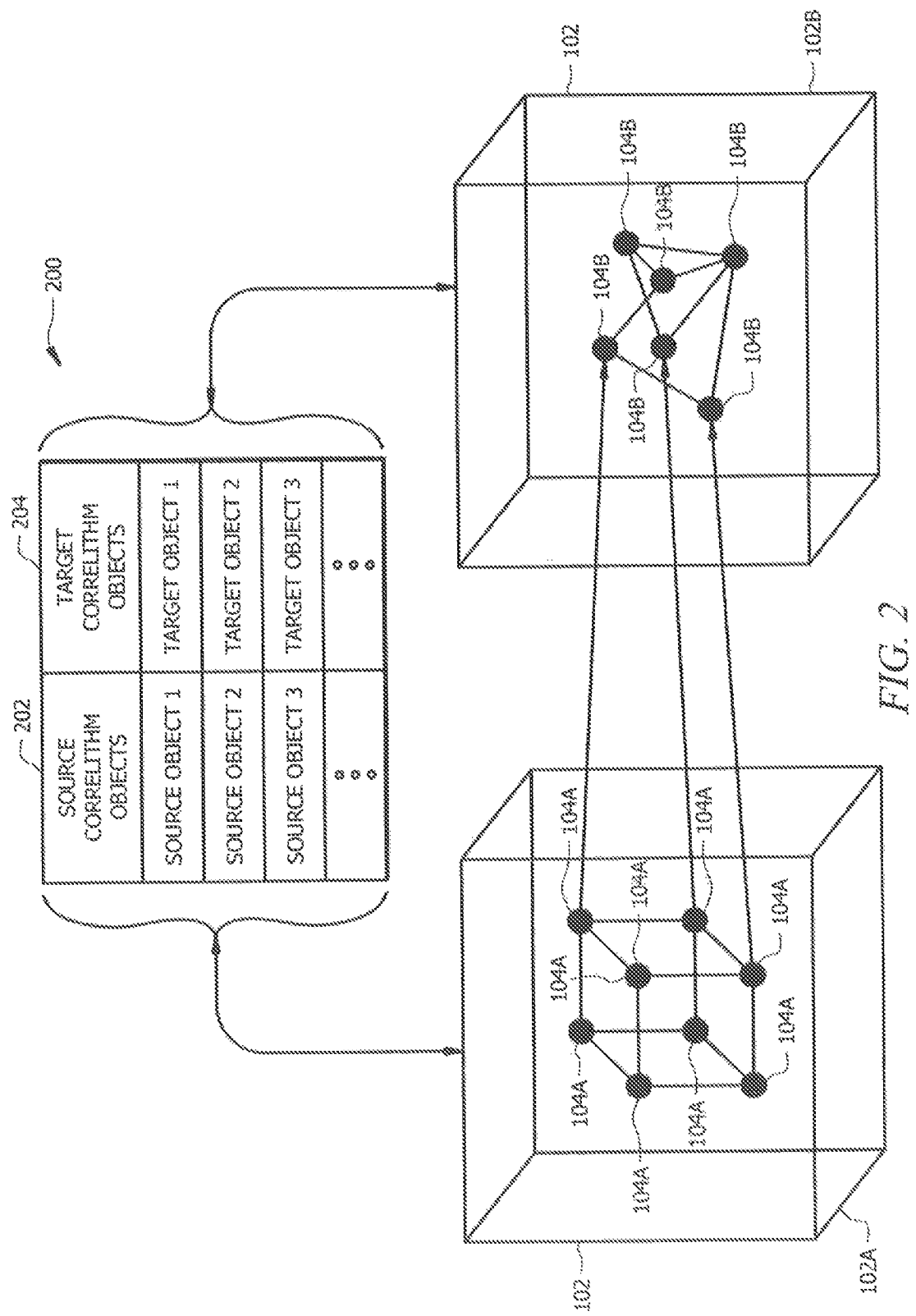
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
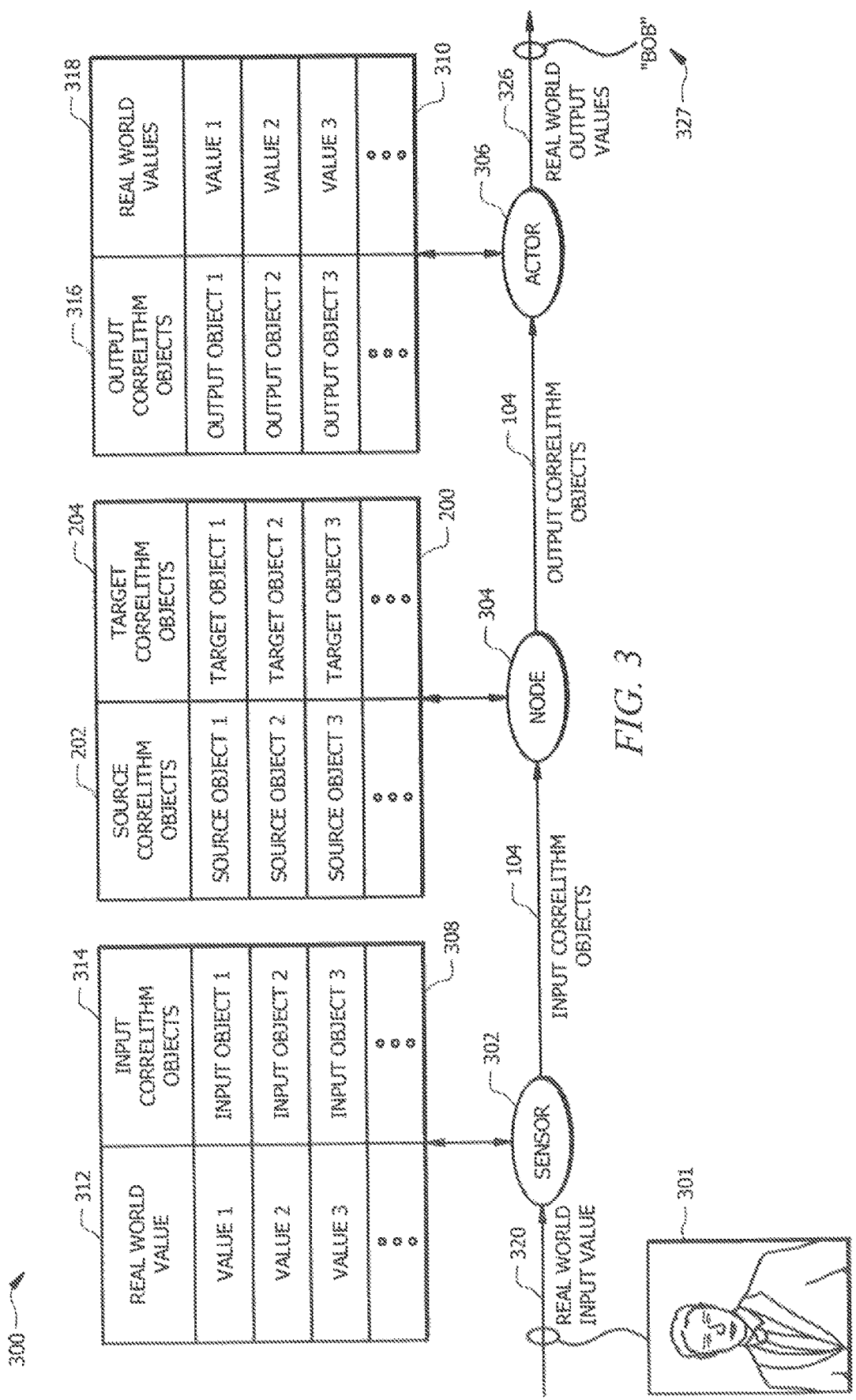
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real world output value 326 based on the received correlithm object 104, and to output the real world output value 326. The real world output value 326 may be a different data type or representation of the original data sample. As an example, the real world input value 320 may be an image 301 of a person and the resulting real world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In smile embodiments, one or more mapping functions may be employed to translate between a correlithm object 104 in an n-dimensional space and a real world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
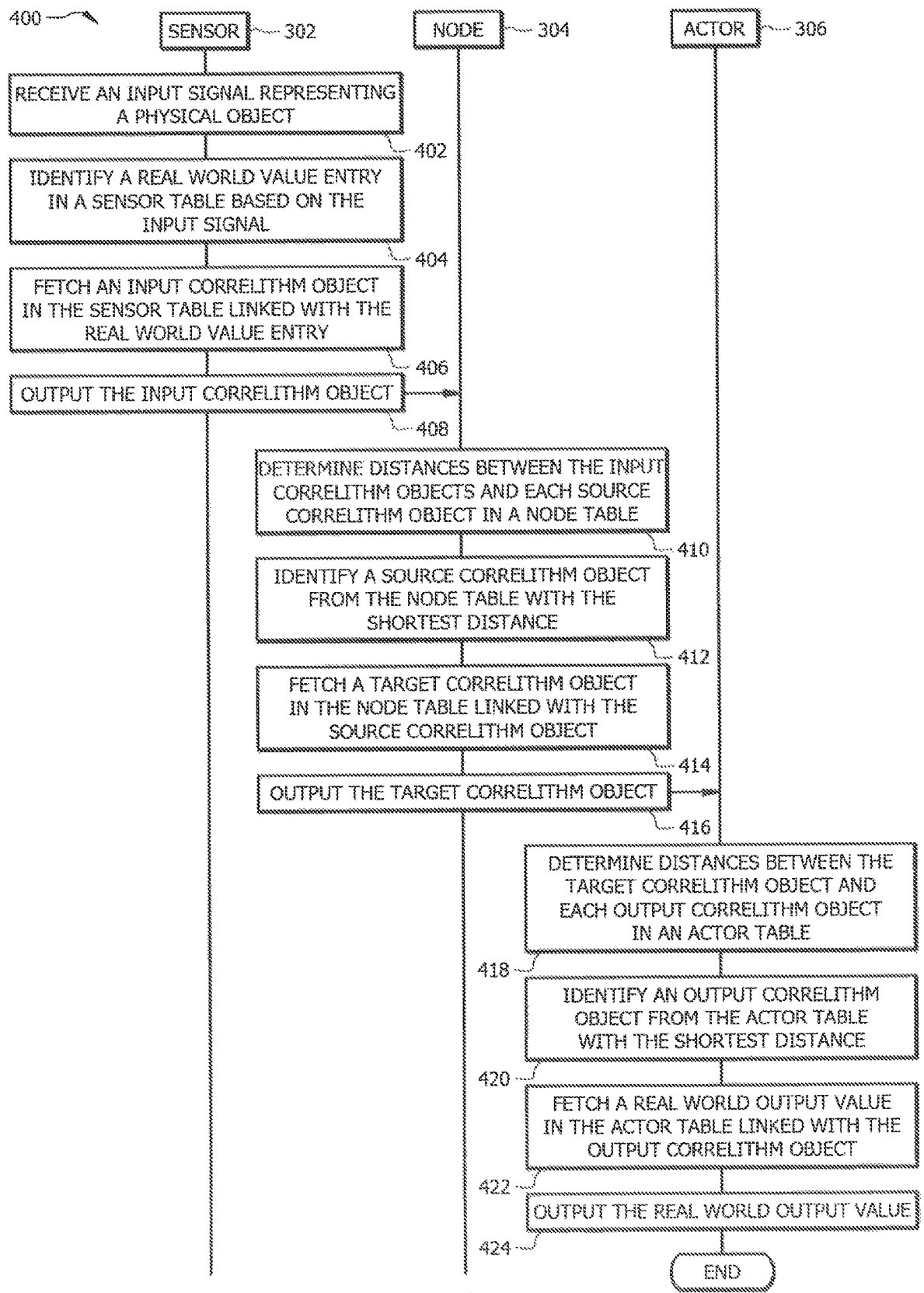
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real world value entry in a sensor table 308 based on the input signal. In one embodiment, the system 300 identifies a real world value entry in the sensor table 308 that matches the input signal. For example, the real world value entries may comprise previously stored images. The sensor 302 may compare the received image to the previously stored images to identify a real world value entry that matches the received image. In one embodiment, when the sensor 302 does not find an exact match, the sensor 302 finds a real world value entry that closest matches the received image.

At step 406, the sensor 302 identifies and fetches an input correlithm object 104 in the sensor table 308 linked with the real world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real world output value in the actor table 310 linked with the output correlithm object 104. The real world output value may be any suitable type of data sample that corresponds with the original input signal. For example, the real world output value may be text that indicates the name of the person in the image or some other identifier associated with the person in the image. As another example, the real world output value may be an audio signal or sample of the name of the person in the image. In other examples, the real world output value may be any other suitable real world signal or value that corresponds with the original input signal. The real world output value may be in any suitable data type or format.

At step 424, the actor 306 outputs the identified real world output value. In one embodiment, the actor 306 may output the real world output value in real-time to a peripheral device (e.g. a display or a speaker). In one embodiment, the actor 306 may output the real world output value to a memory or database. In one embodiment, the real world output value is sent to another sensor 302. For example, the real world output value may be sent to another sensor 302 as an input for another process.

Figure 5:
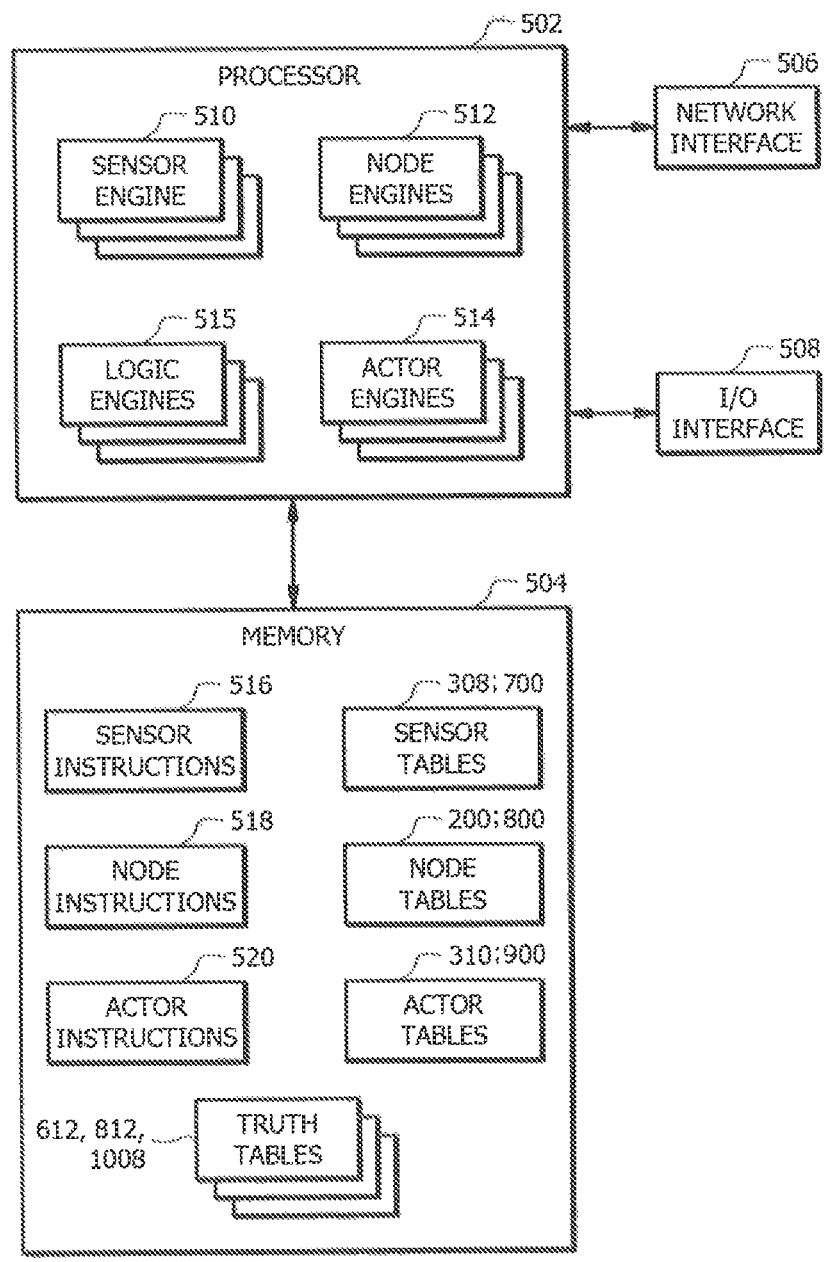
FIG. 5 is a schematic diagram of an embodiment a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, and actor engines 514. In an embodiment, the sensor engines 510, the node engines 512, and the actor engines 514 are implemented using logic units, FPGAs, ASICs, DSPs, or any other suitable hardware. The sensor engines 510, the node engines 512, and the actor engines 514 are each configured to implement a specific set of rules or process that provides an improved technological result.

In one embodiment, the sensor engine 510 is configured to receive a real world value 320 as an input, to determine a correlithm object 104 based on the real world value 320, and to output the correlithm object 104. Examples of the sensor engine 510 in operation are described in FIG. 4.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. Examples of the node engine 512 in operation are described in FIG. 4.

In one embodiment, the actor engine 514 is configured to receive a correlithm object 104 (e.g. an output correlithm object 104), to determine a real world output value 326 based on the received correlithm object 104, and to output the real world output value 326. Examples of the actor engine 514 in operation are described in FIG. 4.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, sensor tables 308 and 700, node tables 200 and 800, actor tables 310 and 900, and/or any other data or instructions. The sensor instructions 516, the node instructions 518, and the actor instructions 520 comprise any suitable set of instructions, logic, rules, or code operable to execute the sensor engine 510, node engine 512, and the actor engine 514, respectively.

The sensor tables 308, the node tables 200, and the actor tables 310 may be configured similar to the sensor tables 308, the node tables 200, and the actor tables 310 described in FIG. 3, respectively.

The network interface 506 is configured to enable wired and/or wireless communications. The network interface 506 is configured to communicate data with any other device or system. For example, the network interface 506 may be configured for communication with a modem, a switch, a router, a bridge, a server, or client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

Figure 6:
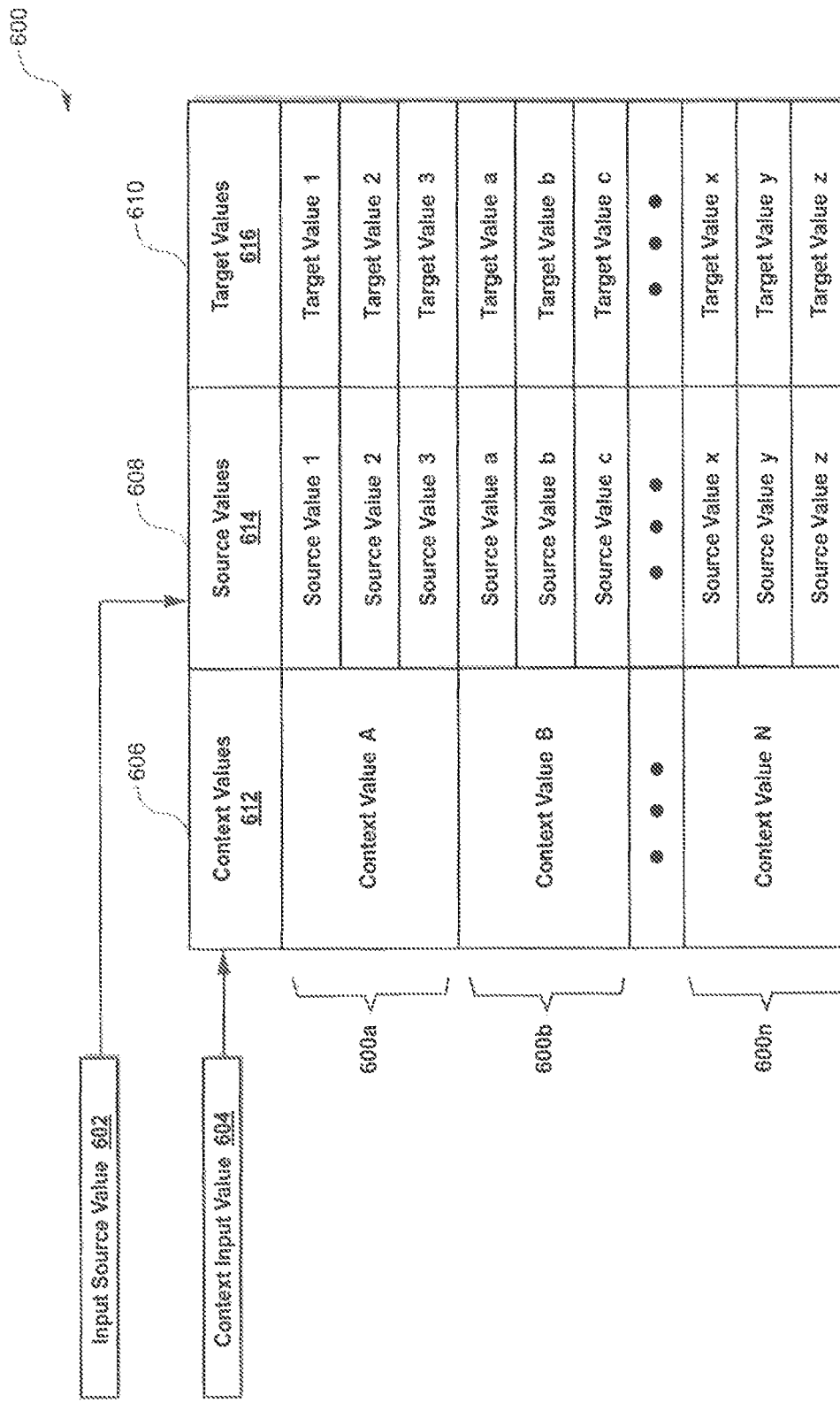
FIG. 6 illustrates an exemplary embodiment of a mapping table, according to the present disclosure.
Figure 7:
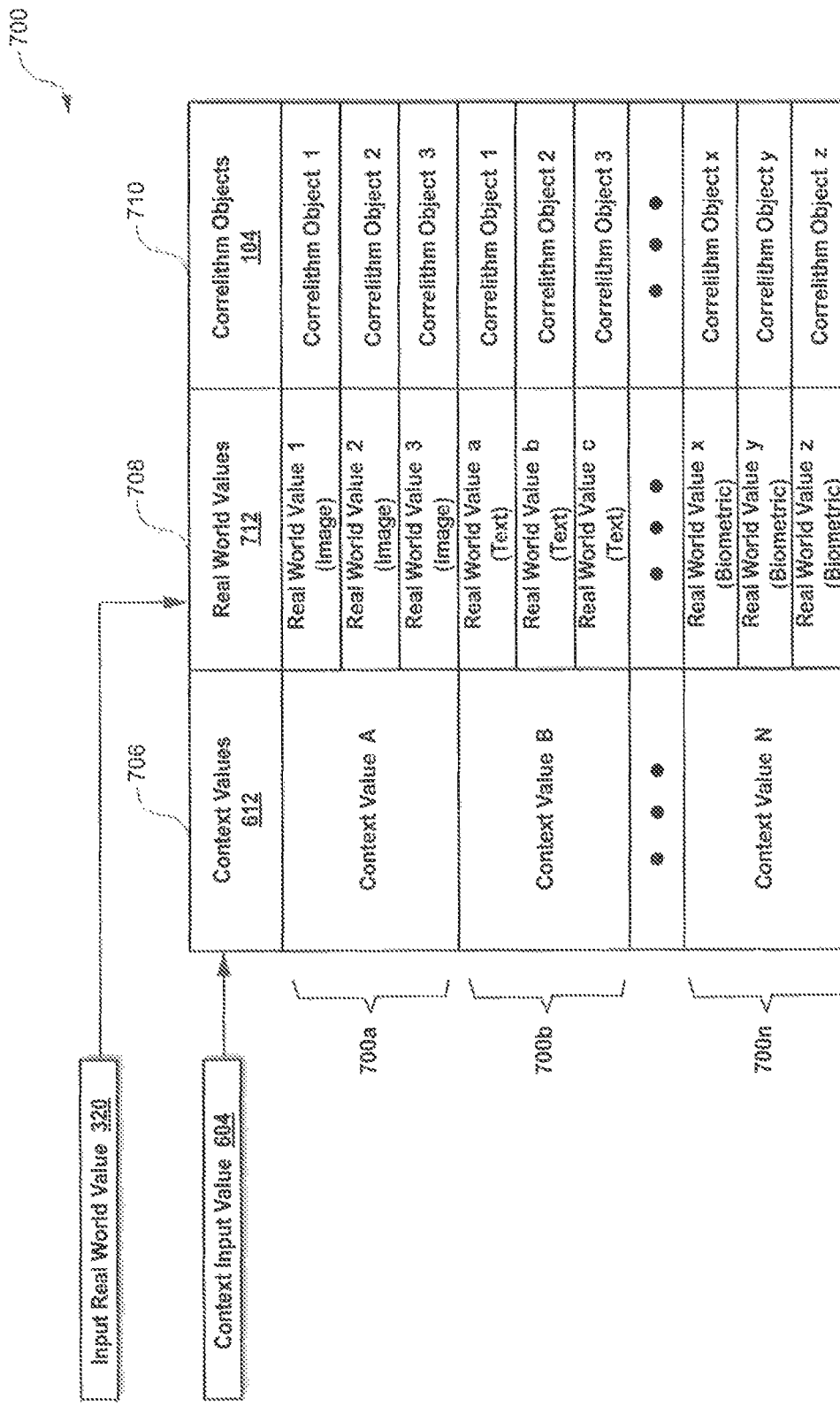
FIG. 7 illustrates an exemplary embodiment of a sensor table, according to the present disclosure.
Figure 8:
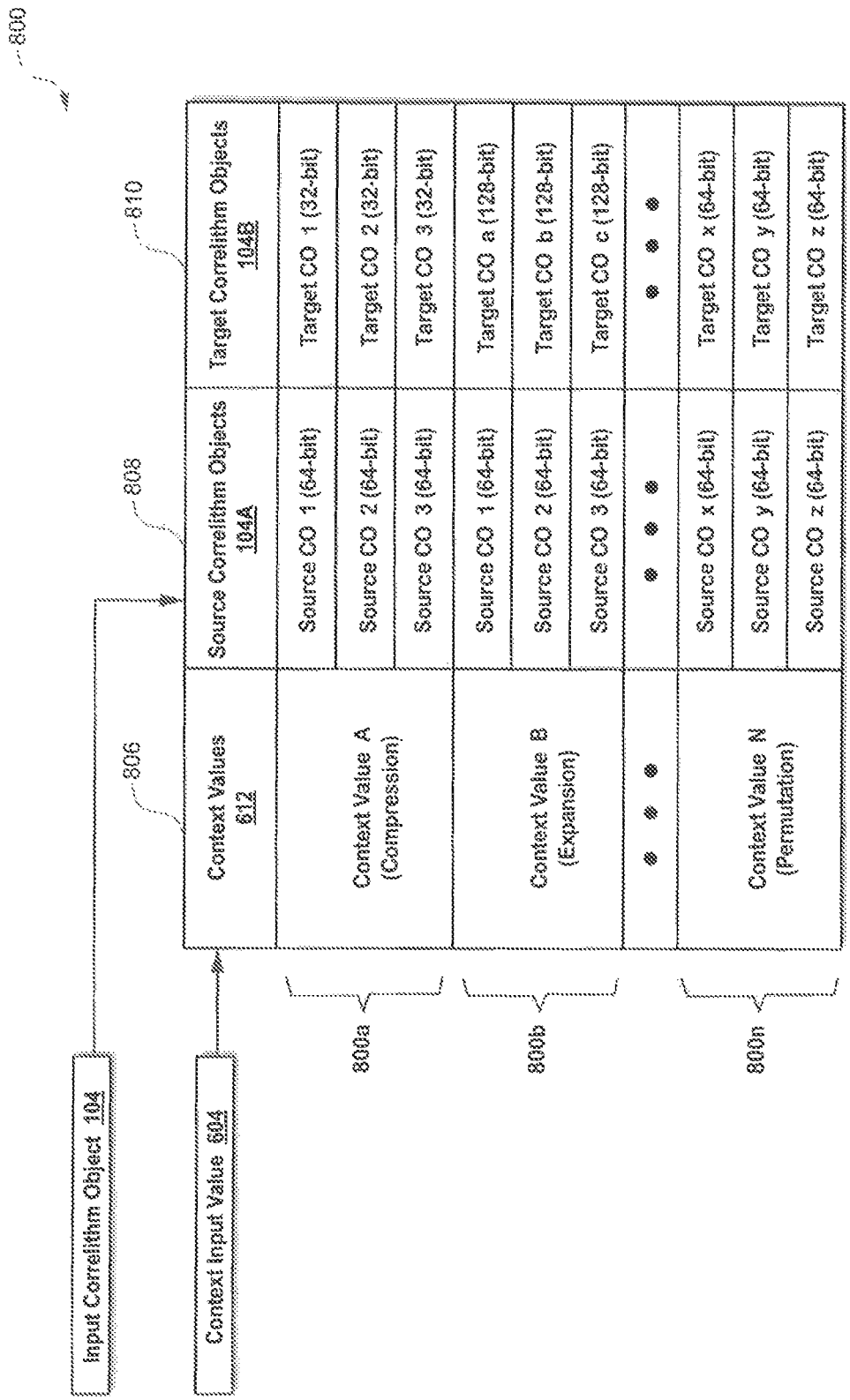
FIG. 8 illustrates an exemplary embodiment of a node table, according to the present disclosure.
Figure 9:
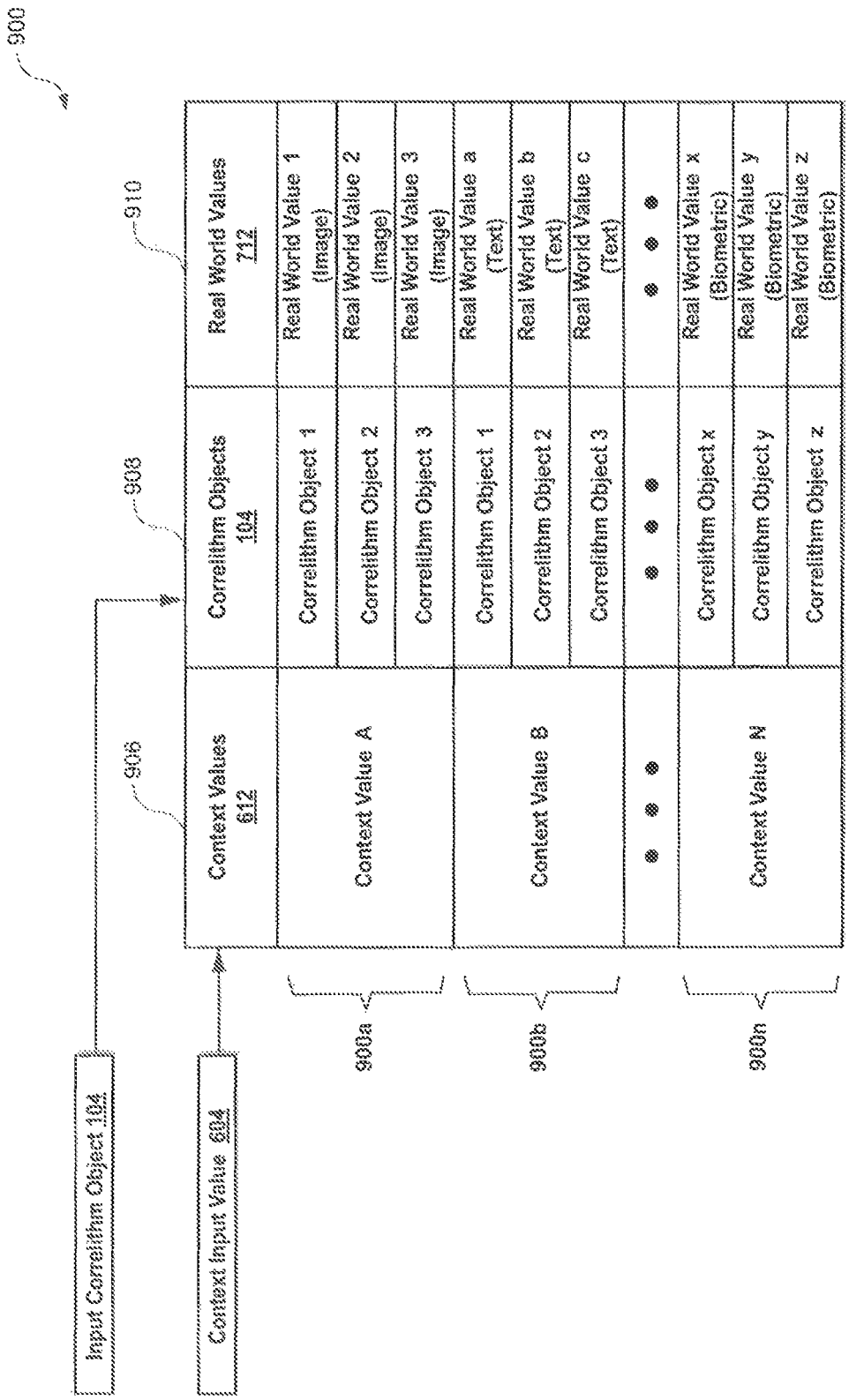
FIG. 9 illustrates an exemplary embodiment of an actor table, according to the present disclosure.
Figure 10:
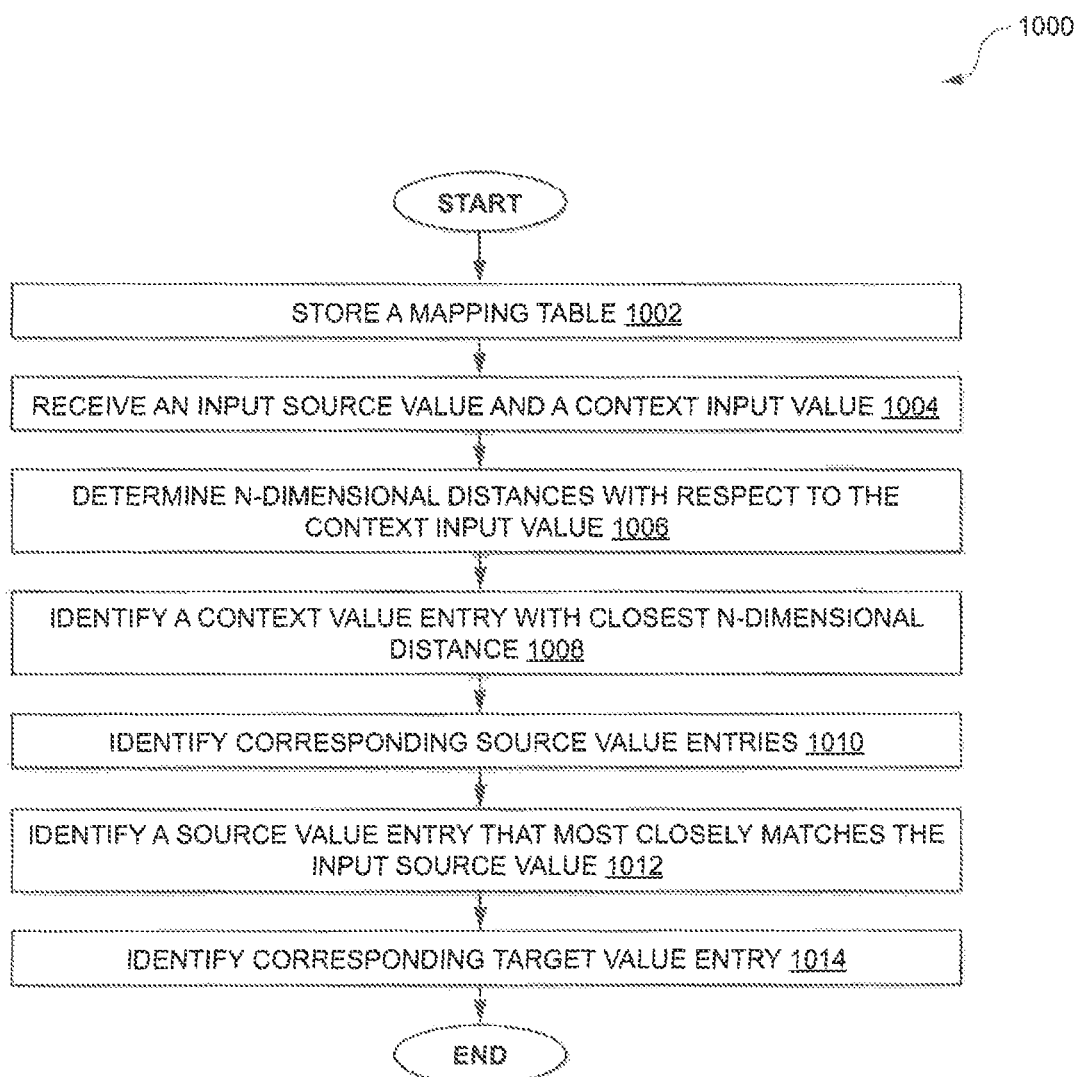
FIG. 10 presents a flowchart illustrating an exemplary embodiment of a method of processing correlithm objects, according to the present disclosure.

FIGS. 6-9 illustrate embodiments of mapping tables 600, 700, 800, and 900 stored in memory 504 of user device 100. FIG. 6 illustrates an embodiment of a general mapping table 600 configured with a first column 606 that includes multiple context values 612, a second column 608 that includes a number of source values 614 corresponding to the context values 612, and a third column 610 that includes a number of target values 616 corresponding to the source values 614. Mapping table 600 may be configured as a sensor table 700, a node table 800, or an actor table 900, in different embodiments. FIG. 7 illustrates an embodiment of a sensor table 700 configured with a first column 706 that includes multiple context values 612, a second column 708 that includes a number of real world values 712 corresponding to the context values 612, and a third column 710 that includes a number of correlithm objects 104 corresponding to the real world values 712. FIG. 8 illustrates an embodiment of a node table 800 configured with a first column 806 that includes multiple context values 612, a second column 808 that includes a number of input correlithm objects 104A corresponding to the context values 612, and a third column 810 that includes a number of output correlithm objects 104B corresponding to the input correlithm objects 104A. FIG. 9 illustrates an embodiment of an actor table 900 configured with a first column 906 that includes multiple context values 612, a second column 908 that includes a number of correlithm objects 104 corresponding to the context values 612, and a third column 910 that includes a number of real world values 712 corresponding to the correlithm objects 104.

Referring to FIG. 6, mapping table 600 is configured with a first column 606 that includes multiple context values 612, a second column 608 that includes a number of source values 614 corresponding to the context values 612, and a third column 610 that includes a number of target values 616 corresponding to the source values 614. In general, mapping table 600 is used by a correlithm object processing system (e.g., a sensor 302, a node 304, and/or an actor 306) implemented in a computer architecture 500 to map or link context values 612, source values 614 (e.g., real world values 712, correlithm objects 104), and target values 616 (e.g., real world values 712, correlithm objects 104). For example, the correlithm object processing system may use mapping table 600 to convert an input source value 602 to a target value 616. Each context value 612 in column 606 may include a correlithm object 104 comprising a n-bit digital word of binary values in some embodiments. Yet in some alternative embodiments, each context value 612 in column 606 may include a real world value. Real world values are any type of signal, value, or representation of data samples. Examples of real world values include, but are not limited to, images, pixel values, text, audio signals, electrical signals, and biometric signals. Context values 612 in column 606 may be configured to indicate formats of corresponding source values 614 in column 608, formats of corresponding target values 616 in column 610, or types of operations performed on corresponding source values 614 in column 608. Context values 612 in column 606 will be described in greater detail below with reference to FIGS. 7-9.

Source values 614 in column 608 may include real world values 712 in some embodiments. Real world values 712 are any type of signal, value, or representation of data samples. Examples of real world values 712 include, but are not limited to, images, pixel values, text, audio signals, electrical signals, and biometric signals. Yet in other embodiments, source values 614 in column 608 may include correlithm objects 104. Target values 616 in column 610 may include real world values 712 in some embodiments. Yet in other embodiments, target values 616 in column 612 may include correlithm objects 104. Note that at least one column of column 608 and column 610 includes correlithm objects 104. For example, when mapping table 600 is configured as a sensor table 700, column 608 includes real world values 712 and column 610 includes correlithm objects 104. As another example, when table 600 is configured as a node table 800, both column 608 and column 610 include correlithm objects 104. In another example, when table 600 is configured as an actor table 900, column 608 includes correlithm objects 104 and column 610 includes real world values 712.

Note that each context value 612 in column 606 corresponds to a subset of the source values 614 in column 608 and a subset of the target values 616 in column 610. A context value 612 in column 606, a corresponding subset of the source values 614 in column 608, and a corresponding subset of the target values 616 in column 610 constitute a subsection of the mapping table 600.

Mapping table 600 includes any suitable number of subsections, such as a first subsection 600a of the mapping table 600, a second subsection 600b of the mapping table 600, and an n-th subsection 600n of the mapping table 600. The first subsection 600a include a first context value 612 in column 606, a first subset of the source values 614 in column 608, and a first subset of the target values 616 in column 610 that are corresponding to the first subset of the source values 614. For example, as illustrated in FIG. 6, the first subsection 600a includes context value A, source values 1-3, and the corresponding target values 1-3. The second subsection 600b include a second context value 612 in column 606, a second subset of the source values 614 in column 608, and a second subset of the target values 616 in column 610 that are corresponding to the second subset of the source values 614. For example, as illustrated in FIG. 6, the second subsection 600b includes context value B, source values a-c, and the corresponding target values a-c. The nth subsection 600n include an n-th context value 612 in column 606, an n-th subset of the source values 614 in column 608, and an n-th subset of the target values 616 in column 610 that are corresponding to the n-th subset of the source values 614. For example, as illustrated in FIG. 6, the n-th subsection 600n includes context value N, corresponding source values x-z, and the corresponding target values x-z. In some embodiments, the source values 614 included in the first, the second, and the n-th subsections of table 600 mutually exclusive of each other, or non-overlapping. In other embodiments, the source values 614 included in the first, the second, and the n-th subsections of table 600 are overlapping or at least partially overlapping. In some embodiments, the target values 616 included in the first, the second, and the n-th subsections of table 600 mutually exclusive of each other, or non-overlapping. In other embodiments, the target values 616 included in the first, the second, and the n-th subsections of table 600 are overlapping or at least partially overlapping.

The first, second, and n-th subsections of mapping table 600 are each illustrated as having three source and target values for illustrative purposes only. They may have any suitable number of values that may be the same or different from each other.

Although table 600 is described with respect to columns 606, 608, and 610, one of ordinary skill in the art will appreciate that any suitable organization of data or data structure that can map the context values to the source values and the target values.

Dividing mapping table 600 into multiple subsections with respect to the context values 612 facilitates quickly locating a source value 614 from the mapping table 600 that matches the input source value 602. For example, the disclosed correlithm object processing system does not need to look up a matching source value 614 from the whole source value entries of mapping table 600. Instead, the disclosed correlithm object processing system can only look up the matching source value 614 from the source value entries in an identified subsection (e.g., 600a, 600b, or 600n) that corresponds to an identified context value 612. This increases the speed and efficiency of looking up a matching source value 614 in the mapping table 600, reduces the response time of the disclosed correlithm object processing system, and conserves computing resources including memories and bandwidth. This also reduces bottleneck in the network and in the overall correlithm object processing system.

In operation, a correlithm object processing system (e.g., a sensor 302, a node 304, or an actor 306) implementing in a computer architecture 500 receives an input source value 602 and a context input value 604. The correlithm object processing system may be instructed to convert input source value 602 to a target value 616. Input source value 602 may be a real world value 320 for a sensor 302, and may be a correlithm object 104 for a node 304 or an actor 306. The context input value 604 may be a correlithm object 104 comprising an n-bit word of binary values or a real world value that indicates a format of input source value 602, an operation performed on input source value 602, or a format of the target value 616 converted from input source value 602. The correlithm object processing system compares the context input value 604 with each context value 612 in column 606 and identifies a context value 612 in column 606 that most closely matches the context input value 604. For example, in some embodiments, if the context input value 604 and each of the context values 612 in column 606 is a correlithm object 104 comprising an n-bit word of binary values, the correlithm object processing system computes an n-dimensional distance (e.g., Hamming distance, Minkowski distance, or other suitable distance) between the context input value 604 and each of the context values 612 in column 606. With respect to calculating a Hamming distance, as described above with respect to at least FIG. 1, the determined n-dimensional distances are based on differences between the binary values representing the context input value 604 and the binary values representing each context value 612 in column 606 of mapping table 600.

Continuing with the example, the correlithm object processing system then identifies a context value 612 in column 606 with the closest n-dimensional distance (e.g., smallest Hamming distance) to the context input value 604. For example, referring to FIG. 6, the correlithm object processing system may compute a first Hamming distance of 45 for context value A in column 606 with respect to the context input value 604, a second Hamming distance of 9 for context value B in column 606 with respect to the context input value 604, and a third Hamming distance of 21 for context value N in column 606 with respect to the context input value 604. The correlithm object processing system then identifies context value B in column 606 with the smallest Hamming distance (i.e., 9) to the context input value 604.

Next, the correlithm object processing system identifies a subset of the source values 614 in column 608 that correspond to the identified context value 612 in column 606 with the closest n-dimensional distance to the context input value 604. Continuing with the example above, after identifying context value B in column 606 with the smallest Hamming distance (i.e., 9) to the context input value 604, the correlithm object processing system identifies the source values a-c in subsection 600b that correspond to context value B.

Then, from the identified subset of the source values 614 in column 608, the correlithm object processing system identifies a source value 614 that most closely matches the input source value 602, as detailed below with reference to FIGS. 7-9. The correlithm object processing system further identifies a target value 616 in column 610 corresponding to the identified source value 614 that most closely matches the input source value 602, and outputs the identified target value 616 for further processing.

Referring to FIG. 7, mapping table 600 is configured as a sensor table 700 with a first column 706 that includes multiple context values 612, a second column 708 that includes a number of real world values 712 corresponding to the context values 612, and a third column 710 that includes a number of correlithm objects 104 corresponding to the real world values 712. A correlithm object processing system implemented as a sensor 302 may use sensor table 700 to convert real world values 712 to correlithm objects 104. Sensor table 700 includes any suitable number of subsections, such as a first subsection 700a of the sensor table 700, a second subsection 700b of the sensor table 700, and an n-th subsection 700n of the sensor table 700.

Each context value 612 in column 708 may include a correlithm object 104 comprising a n-bit digital word of binary values or a real world value. In some embodiments, context values 612 in column 706 are configured to indicate formats of corresponding real world values 712 in column 708 of sensor table 700, including, but not limited to, images, pixel values, text, audio signals, electrical signals, and biometric signals. For example, as illustrated in FIG. 7, context value A in column 706 may include a correlithm object 104 or a real world value indicating that corresponding real world values 1-3 in subsection 700a have a format of an image. As another example, context value B in column 706 may include a correlithm object 104 or a real world value indicating that corresponding real world values a-c in subsection 700b have a format of a text file. As another example, context value N in column 706 may include a correlithm object 104 or a real world value indicating that corresponding real world values x-z in subsection 700n have a format of a biometric signal (e.g., finger prints).

Note that, in some embodiments, the real world values 712 and/or the correlithm objects 104 included in different subsections of sensor table 700 mutually exclusive of each other, or non-overlapping. Yet in other embodiments, the real world values 712 and/or the correlithm objects 104 included in different subsections of sensor table 700 are overlapping or at least partially overlapping. For example, referring to FIG. 7, subsection 700a and subsection 700b both include correlithm object 1 that corresponds to real world value 1 and real world value a in the two subsections, respectively. This can be understood by assuming that real world value 1 having a format of an image is associated with a person represented by correlithm object 1, and assuming that real world value a having a format of a text file is associated with the same person represented by correlithm object 1. Similarly, subsections 700a and 700b both have correlithm objects 2 and 3.

In operation, a sensor 302 implementing in a computer architecture 500 receives an input real world value 320 and a context input value 604. Sensor 302 may be instructed to convert input real world value 320 to a correlithm object 104. Input real world value 320 may be a real world value having a format including, but not limited to, images, pixel values, text, audio signals, electrical signals, and biometric signals. Context input value 604 may be a correlithm object 104 including an n-bit word of binary values or a real world value that indicates a format of input real world value 320. Sensor 302 compares the context input value 604 with each context value 612 in column 706 and identifies a context value 612 in column 706 that most closely matches the context input value 604. For example, in some embodiments, sensor 302 computes an n-dimensional distance to (e.g., Hamming distance, Minkowski distance, or other suitable distance) between the context input value 604 and each of the context values 612 in column 706, and identifies a context value 612 in column 706 with the closest n-dimensional distance (e.g., smallest Hamming distance) to the context input value 704. After identifying the context value 612 in column 706 that most closely matches the context input value 604, sensor 302 identifies a subset of the real world values 712 in column 708 that correspond to the identified context value 612 in column 706 that most closely matches context input value 604. For example, sensor 302 may identify context value A in column 706 that most closely matches context input value 604, and identifies real world values 1-3 in subsection 700a that correspond to the identified context value A.

Then, sensor 302 compares input real world value 320 to each of the previously identified subset of real world values 712, and identifies a real world value 712 from the previously identified subset of real world values 712 that matches input real world value 320. Note that input real world value 320 and the previously identified subset of real world values 712 in column 708 have a same format (e.g., image). Continuing with the above example, after identifying real world values 1-3 in subsection 700a that correspond to the identified context value A, sensor 302 may identify real world value 1 storing an image that matches the image of input real world value 320. Sensor 302 further identifies a correlithm object 104 in column 710 that corresponds to the previously identified real world value 712 in column 708.

Referring to FIG. 8, mapping table 600 is configured as a node table 800 with a first column 806 that includes multiple context values 612, a second column 808 that includes a number of source correlithm objects 104A corresponding to the context values 612, and a third column 810 that includes a number of target correlithm objects 104B corresponding to the source correlithm objects 104A. The source correlithm objects 104A and the target correlithm objects 104B may be defined in n-dimensional spaces that have the same number of dimensions or different numbers of dimensions. A correlithm object processing system implemented as a node 304 may use node table 800 to convert source correlithm objects 104A to target correlithm objects 104B. Node table 800 includes any suitable number of subsections, such as a first subsection 800a of the node table 800, a second subsection 800b of the node table 800, and an n-th subsection 800n of the node table 800.

Each context value 612 in column 806 may include a correlithm object 104 comprising a n-bit digital word of binary values or a real world value. In some embodiments, context values 612 in column 806 are configured to indicate types of operations performed on corresponding source correlithm objects 104A in column 808 of node table 800, including, but not limited to, expansion, compression, and permutation. For example, as illustrated in FIG. 8, context value A in column 806 may include a correlithm object 104 or a real world value indicating a compression operation that converts the corresponding 64-bit source correlithm objects 1-3 to corresponding 32-bit target correlithm objects 1-3 in subsection 800a. As another example, context value B in column 806 may include a correlithm object 104 or a real world value indicating an expansion operation that converts the corresponding 64-bit source correlithm objects 1-3 to corresponding 128-bit target correlithm objects a-c in subsection 800b. As another example, context value N in column 806 may include a correlithm object 104 or a real world value indicating a permutation operation that converts the corresponding 64-bit source correlithm objects x-z to corresponding 64-bit target correlithm objects x-z in subsection 800n.

In operation, a node 304 implementing in a computer architecture 500 receives an input source correlithm 104 and a context input value 604. Node 304 may be instructed to convert input source correlithm 104 to a target correlithm object 104B. Input source correlithm 104 may include an n-bit word of binary values. For example, input source correlithm 104 may include a 64-bit word of binary values. Context input value 604 may be a correlithm object 104 including an n-bit word of binary values or a real world value that indicates a type of operation performed on input correlithm object 104. Node 304 compares the context input value 604 with each context value 612 in column 806 and identifies a context value 612 in column 806 that most closely matches the context input value 604. For example, in some embodiments, node 304 computes an n-dimensional distance (e.g., Hamming distance, Minkowski distance, or other suitable distance) between the context input value 604 and each of the context values 612 in column 806, and identifies a context value 612 in column 806 with the closest n-dimensional distance (e.g., smallest Hamming distance) to the context input value 604. After identifying the context value 612 in column 806 that most closely matches the context input value 604, node 304 identities a subset of the source correlithm objects 104A in column 808 that correspond to the identified context value 612 in column 806 that most closely matches context input value 804. For example, node 304 may identify context value A in column 806 that most closely matches context input value 604, and identifies source correlithm objects 1-3 in subsection 800a that correspond to identified context value A.

Then, node 304 compares input correlithm object 104 to each of the previously identified subset of source correlithm of 104A in column 808, and identifies a source correlithm object 104A from the previously identified subset of source correlithm objects 104A that most closely matches input source correlithm object 104. Specifically, node 304 computes an n-dimensional distance (e.g., Hamming distance, Minkowski distance, or other suitable distance) between the input correlithm object 104 and each of the previously identified subset of source correlithm objects 104A in column 808, and identifies a source correlithm object 104A from the previously identified subset of source correlithm objects 104A with the closest n-dimensional distance (e.g., smallest Hamming distance) to the input correlithm object 104. Continuing with the above example, after identifying source correlithm objects 1-3 in subsection 800a that correspond to the identified context value A, node 304 may compute a Hamming distance between the input correlithm object 104 and each of the identified source correlithm objects 1-3 in subsection 800a. Node 304 may identify a source correlithm object 104A from the identified source correlithm objects 1-3 in subsection 800a with the smallest Hamming distance based on the computed Hamming distances. Node 304 further identifies a target correlithm object 104B corresponding to the identified source correlithm object 104A with the closest n-dimensional distance to the input correlithm object 104.

Referring to FIG. 9, mapping table 600 is configured as an actor table 900 with a first column 906 that includes multiple context values 612, a second column 908 that includes a number of correlithm objects 104 corresponding to the context values 612, and a third column 910 that includes a number of real world values 712 corresponding to the correlithm objects 104. A correlithm object processing system implemented as an actor 306 may use actor table 900 to convert correlithm objects 104 to real world values 712. Actor table 900 includes any suitable number of subsections, such as a first subsection 900a of the actor table 900, a second subsection 900b of the actor table 900, and an nth subsection 900n of the actor table 900.

Each context value 612 in column 906 may include a correlithm object 104 comprising a n-bit digital word of binary values or a real world value. In some embodiments, context values 612 in column 906 are configured to indicate formats of corresponding real world values 712 in column 910 of actor table 900, including, but not limited to, images, pixel values, text, audio signals, electrical signals, and biometric signals. For example, as illustrated in FIG. 9, context value A in column 906 may include a correlithm object 104 or a real world value indicating that corresponding real world values 1-3 in subsection 900a have a format of an image. As another example, context value B in column 906 may include a correlithm object 104 or a real world value indicating that corresponding real world values a-c in subsection 900b have a format of a text file. As another example, context value N in column 906 may include a correlithm object 104 or a real world value indicating that corresponding real world values x-z in subsection 900n have a format of a biometric signal (e.g., finger prints).

Note that, in some embodiments, the real world values 712 and/or the correlithm objects 104 included in different subsections of actor table 900 are overlapping or at least partially overlapping. For example, referring to FIG. 9, subsection 900a and subsection 900b both include correlithm object 1 that corresponds to real world value 1 and real world value a in the two subsections, respectively. This can be understood by assuming that real world value 1 having a format of an image is associated with a person represented by correlithm object 1, and assuming that real world value a having a format of a text file is associated with the same person represented by correlithm object 1. Similarly, subsections 900a and 900b both include correlithm objects 2 and 3.

In operation, an actor 306 implementing in a computer architecture 500 receives an input correlithm object 104 and a context input value 604. Actor 306 may be instructed to convert input correlithm object 104 to a real world value 712. Input source correlithm 104 may include an n-bit word of binary values. Context input value 604 may be a correlithm object 104 including an n-bit word of binary values or a real world value that indicates a format of the real world value 712 converted from input correlithm object 104. Actor 306 compares the context input value 604 with each context value 612 in column 906 and identifies a context value 612 in column 906 that most closely matches the context input value 604. For example, in some embodiments, actor 306 computes an n-dimensional distance (e.g., Hamming distance, Minkowski distance, or other suitable distance) between the context input value 604 and each of the context values 612 in column 906, and identifies a context value 612 in column 906 with the closest n-dimensional distance (e.g., smallest Hamming distance) to the context input value 604. After identifying the context value 612 in column 906 that most closely matches the context input value 604, actor 306 identifies a subset of the correlithm objects 104 in column 908 that correspond to the identified context value 612 in column 906. For example, actor 306 may identify context value A in column 906 that most closely matches context input value 604, and identifies correlithm objects 1-3 in subsection 900a that correspond to context value A.

Then, actor 306 compares input correlithm object 104 to each of the previously identified subset of correlithm objects 104, and identifies a correlithm object 104 from the previously identified subset of correlithm objects 104 that most closely matches input correlithm object 104. Specifically, actor 306 computes an dimensional distance (e.g., Hamming distance, Minkowski distance, or other suitable distance) between the input correlithm object 104 and each of the previously identified subset of correlithm objects 104, and identifies a correlithm object 104 from the previously identified subset of correlithm objects 104 with the closest n-dimensional distance (e.g., smallest Hamming distance) to the input correlithm object 104. Continuing with the above example, after identifying correlithm objects 1-3 in subsection 900a that correspond to the identified context value A, actor 306 may compute a Hamming distance between the input correlithm object 104 and each of the identified correlithm objects 1-3 in subsection 900a. Actor 306 may identify a correlithm object 104 from the identified correlithm objects 1-3 in subsection 900a with the smallest Hamming distance based on the computed Hamming distances. Actor 306 further identifies a real world value 712 corresponding to the identified correlithm object 104 with the closest n-dimensional distance to the input correlithm object 104.

FIG. 10 illustrates one embodiments of a flowchart 1000 implementing a process performed by a correlithm object processing system (e.g., sensor 302, node 304, or actor 306) implemented in a computer architecture 500. Upon starting the process, the correlithm object processing system stores mapping table 600 at step 1002. Mapping table 600 may be configured as sensor table 700, node table 800, or actor table 900, depending on how correlithm object processing system is implemented in computer architecture 500. For example, if the correlithm object processing system is implemented as a sensor 302, mapping table 600 is configured as sensor table 700. If the correlithm object processing system is implemented as a node 304, mapping table 600 is configured as sensor table 800. If the correlithm object processing system is implemented as an actor 306, mapping table 600 is configured as sensor table 900.

At step 1004, the correlithm object processing system receives an input source value 602 and a context input value 604, input source value 602 may be a real world value 320 for a sensor 302, and may be a correlithm object 104 for a node 304 or an actor 306. The context input value 604 may be a correlithm object 104 comprising an n-bit word of binary values or a real world value that indicates a format of input source value 602, an operation performed on input source value 602, or a format of the target value 616 converted from input source value 602. The following steps will be discussed with respect to some embodiments where the context input value 604 and each context value 612 in mapping table 600 is a correlithm object 104 comprising an n-bit word of binary values.

The correlithm object processing system then proceeds to step 1006 and determine an n-dimensional distance (e.g., Hamming distance, Minkowski distance, or other suitable distance) between the context input value 604 and each of the context values 612 in mapping table 600. With respect to calculating a Hamming distance, as described above with respect to at least FIG. 1, the determined n-dimensional distances are based on differences between the binary values representing the context input value 604 and the binary values representing each context value 612 in mapping table 600.

At step 1008, the correlithm object processing system identifies a context value 612 in mapping table 600 with the closest n-dimensional distance (e.g., smallest Hamming distance) to the context input value 604.

Execution proceeds to step 1010, where the correlithm object processing system identifies a subset of the source values 614 in mapping table 600 that correspond to the identified context value 612 in mapping table 600 with the closest n-dimensional distance to the context input value 604. The identified subset of the source values may include real world values 712 in sensor table 700, or correlithm objects 104 in node table 800 and actor table 900.

At step 1012, from the identified subset of the source values 614 in mapping table 600, the correlithm object processing system identifies a source value 614 that most closely matches the input source value 602.

For example, if the input source value 602 is an input real world value 320 and the source values 614 are real world values 712 in sensor table 700, the correlithm object processing system may identify a real world value 712 in the identified subset of real world values 712 in sensor table 700 that matches the input real world value 320. As another example, if the input source value 602 is an input correlithm object 104 and the source values 614 are source correlithm objects 104A in node table 800, correlithm object processing system may computer an n-dimensional distance (e.g., Hamming distance) between the input correlithm object 104 and each of the identified subset of source correlithm objects 104A in node table 800, and identify a source correlithm objects 104A from the identified subset of source correlithm objects 104A with the closest n-dimensional distance (e.g., smallest Hamming distance) to the input correlithm object 104. As another example, if the input source value 602 is an input correlithm object 104 and the source values are correlithm objects 104 in actor table 900, correlithm object processing system may computer an n-dimensional distance (e.g., Hamming distance) between the input correlithm object 104 and each of the identified subset of correlithm objects 104 in actor table 900, and identify a correlithm objects 104 from the identified subset of correlithm objects 104 with the closest dimensional distance (e.g., smallest Hamming distance) to the input correlithm object 104.

At step 1014, the correlithm object processing system further identifies a target value 616 in mapping table 600 corresponding to the identified source value 614 with the closest n-dimensional distance (e.g., smallest Hamming distance) to the context input value 604, and outputs the identified target value 616 for further processing.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 USC. § 112(f) as it exists on the date of filing hereof unless the words "means for" or "step for" are explicitly used in the particular claim.

The invention claimed is:

1. A device configured to emulate a correlithm object processing system, comprising:
   a memory operable to store a correlithm object mapping table that comprises a plurality of context value entries, a plurality of source value entries, and a plurality of target value entries corresponding to the plurality of source value entries, wherein:
   each context value entry corresponds to a subset of the source value entries, each context value entry comprising a correlithm object, the correlithm object comprising an n-bit digital word of binary values;
   the plurality of source value entries comprise a plurality of real world values or a plurality of correlithm objects; and
   the plurality of target value entries comprise a plurality of real world values or a plurality of correlithm objects; and
   one or more processors communicatively coupled to the memory and operable to:
   receive a first input source value;
   receive a first context input value, the first context input value comprising a correlithm object having an n-bit digital word of binary values;
   determine n-dimensional distances between the first context input value and each of the plurality of context value entries, wherein the determined n-dimensional distances are based on differences between the binary values representing the first context input value and the binary values representing each context value entry;
   identify a context value entry from the plurality of context value entries with the closest determined n-dimensional distance to the first context input value;
   identify a subset of the source value entries corresponding to the identified context value entry;
   identify, from the identified subset of the source value entries, a source value entry that matches the first input source value; and
   identify a target value entry corresponding to the identified source value entry;
   wherein one or more of the processors quantify a degree of similarity between (a) different data samples having the same or different data types and/or formats, (b) different facial images, or (c) different images of people, by:
  using the results of the emulation;
  computing n-dimensional distances between data samples; and
  performing non-binary comparisons between data samples using categorical numbers;
wherein the degree of similarity indicates how similar the different data samples are to each other.

2. The device of claim 1, wherein the real world values comprise:
  texts;
  images;
  audio files;
  video files; or
  biometrics.

3. The device of claim 1, wherein:
  the first input source value comprises a real world value;
  the plurality of source value entries comprise a plurality of real world values;
  the plurality of target value entries comprise a plurality of correlithm objects, each correlithm object comprising an n-bit digital word of binary values; and
  identifying, from the identified subset of the source value entries, a source value entry that matches the first input source value comprises:
    comparing the real world value of the first input source value to each real world value of the identified subset of the source value entries; and
    identifying, from the identified subset of the source value entries, a source value entry comprising a real world value that matches the real world value of the first input source value.

4. The device of claim 1, wherein:
  the first input source value comprises a correlithm object, the correlithm object comprising an n-bit digital word of binary values;
  the plurality of source value entries comprise a plurality of correlithm objects, each correlithm object comprising an n-bit digital word of binary values;
  the plurality of target value entries comprise a plurality of correlithm objects; and
  identifying, from the identified subset of the source value entries, a source value entry that matches the first input source value comprises:
    determining n-dimensional distances between the first input source value and each source value entry in the identified subset, wherein the determined n-dimensional distances are based on differences between the binary values representing the first input source value and the binary values representing each source value entry in the identified subset; and
    identifying, from the identified subset of the source value entries, a source value entry with the closest determined n-dimensional distance.

5. The device of claim 4, wherein each of the plurality of target value entries comprises a digital word of binary values having a different number of digits from the n-bit digital word of binary value of a corresponding source value entry.

6. The device of claim 1, wherein:
  the first input source value comprises a correlithm object, the correlithm object comprising an n-bit digital word of binary values;
  the plurality of source value entries comprise a plurality of correlithm objects, each correlithm object comprising an n-bit digital word of binary values;
  the plurality of target value entries comprise a plurality of real world values; and
  identifying, from the identified subset of the source value entries, a source value entry that matches the first input source value comprises:
    determining n-dimensional distances between the first input source value and each source value entry in the identified subset, wherein the determined n-dimensional distances are based on differences between the binary values representing the first input source value and the binary values representing each source value entry in the identified subset; and
    identifying, from the identified subset of the source value entries, a source value entry with the closest determined n-dimensional distance.

7. The device of claim 1, wherein the closest determined n-dimensional distance comprises a Hamming distance.

8. A non-transitory computer-readable medium comprising logic for emulating a correlithm object processing system, the logic, when executed by a processor, operable to:
  store a correlithm object mapping table that comprises a plurality of context value entries, a plurality of source value entries, and a plurality of target value entries corresponding to the plurality of source value entries, wherein:
    each context value entry corresponds to a subset of the source value entries, each context value entry comprising a correlithm object, the correlithm object comprising an n-bit digital word of binary values;
    the plurality of source value entries comprise a plurality of real world values or a plurality of correlithm objects; and
    the plurality of target value entries comprise a plurality of real world values or a plurality of correlithm objects;
  receive a first input source value;
  receive a first context input value, the first context input value comprising a correlithm object having an n-bit digital word of binary values;
  determine n-dimensional distances between the first context input value and each of the plurality of context value entries, wherein the determined n-dimensional distances are based on differences between the binary values representing the first context input value and the binary values representing each context value entry;
  identify a context value entry from the plurality of context value entries with the closest determined n-dimensional distance to the first context input value;
  identify a subset of the source value entries corresponding to the identified context value entry;
  identify, from the identified subset of the source value entries, a source value entry that matches the first input source value;
  identify a target value entry corresponding to the identified source value entry; and
  quantify a degree of similarity between (a) different data samples having the same or different data types and/or formats, (b) different facial images, or (c) different images of people, by:
    using the results of the emulation;
    computing n-dimensional distances between data samples; and
    performing non-binary comparisons between data samples using categorical numbers;
  wherein the degree of similarity indicates how similar the different data samples are to each other.

9. The non-transitory computer-readable medium of claim 8, wherein:
the first input source value comprises a real world value;
the plurality of source value entries comprise a plurality of real world values;
the plurality of target value entries comprise a plurality of correlithm objects, each correlithm object comprising an n-bit digital word of binary values; and
identifying, from the identified subset of the source value entries, a source value entry that matches the first input source value comprises:
comparing the real world value of the first input source value to each real world value of the identified subset of the source value entries; and
identifying, from the identified subset of the source value entries, a source value entry comprising a real world value that matches the real world value of the first input source value.

10. The non-transitory computer-readable medium of claim 8, wherein:
the first input source value comprises a correlithm object, the correlithm object comprising an n-bit digital word of binary values;
the plurality of source value entries comprise a plurality of correlithm objects, each correlithm object comprising an n-bit digital word of binary values;
the plurality of target value entries comprise a plurality of correlithm objects; and
identifying, from the identified subset of the source value entries, a source value entry that matches the first input source value comprises:
determining n-dimensional distances between the first input source value and each source value entry in the identified subset, wherein the determined n-dimensional distances are based on differences between the binary values representing the first input source value and the binary values representing each source value entry in the identified subset; and
identifying, from the identified subset of the source value entries, a source value entry with the closest determined n-dimensional distance.

11. The non-transitory computer-readable medium of claim 10, wherein each of the plurality of target value entries comprises a digital word of binary values having a different number of digits from the n-bit digital word of binary value of a corresponding source value entry.

12. The non-transitory computer-readable medium of claim 8, wherein:
the first input source value comprises a correlithm object, the correlithm object comprising an n-bit digital word of binary values;
the plurality of source value entries comprise a plurality of correlithm objects, each correlithm object comprising an n-bit digital word of binary values;
the plurality of target value entries comprise a plurality of real world values; and
identifying, from the identified subset of the source value entries, a source value entry that matches the first input source value comprises:
determining n-dimensional distances between the first input source value and each source value entry in the identified subset, wherein the determined n-dimensional distances are based on differences between the binary values representing the first input source value and the binary values representing each source value entry in the identified subset; and
identifying, from the identified subset of the source value entries, a source value entry with the closest determined n-dimensional distance.

13. The non-transitory computer-readable medium of claim 8, wherein the closest determined n-dimensional distance comprises a Hamming distance.

14. A method for emulating a correlithm object processing system, the method comprising:
storing a correlithm object mapping table that comprises a plurality of context value entries, a plurality of source value entries, and a plurality of target value entries corresponding to the plurality of source value entries, wherein:
each context value entry corresponds to a subset of the source value entries, each context value entry comprising a correlithm object, the correlithm object comprising an n-bit digital word of binary values;
the plurality of source value entries comprise a plurality of real world values or a plurality of correlithm objects; and
the plurality of target value entries comprise a plurality of real world values or a plurality of correlithm objects;
receiving a first input source value;
receiving a first context input value, the first context input value comprising a correlithm object having an n-bit digital word of binary values;
determining n-dimensional distances between the first context input value and each of the plurality of context value entries, wherein the determined n-dimensional distances are based on differences between the binary values representing the first context input value and the binary values representing each context value entry;
identifying a context value entry from the plurality of context value entries with the closest determined n-dimensional distance to the first context input value;
identifying a subset of the source value entries corresponding to the identified context value entry;
identifying, from the identified subset of the source value entries, a source value entry that matches the first input source value;
identifying a target value entry corresponding to the identified source value entry; and
quantifying a degree of similarity between (a) different data samples having the same or different data types and/or formats, (b) different facial images, or (c) different images of people, by:
using the results of the emulation;
computing n-dimensional distances between data samples; and
performing non-binary comparisons between data samples using categorical numbers;
wherein the degree of similarity indicates how similar the different data samples are to each other.

15. The method of claim 14, wherein the real world values comprise:
texts;
images;
audio files;
video files; or
biometrics.

16. The method of claim 14, wherein:
the first input source value comprises a real world value;
the plurality of source value entries comprise a plurality of real world values;

the plurality of target value entries comprise a plurality of correlithm objects, each correlithm object comprising an n-bit digital word of binary values; and identifying, from the identified subset of the source value entries, a source value entry that matches the first input source value comprises:

comparing the real world value of the first input source value to each real world value of the identified subset of the source value entries; and identifying, from the identified subset of the source value entries, a source value entry comprising a real world value that matches the real world value of the first input source value.

17. The method of claim 14, wherein:

the first input source value comprises a correlithm object, the correlithm object comprising an n-bit digital word of binary values;

the plurality of source value entries comprise a plurality of correlithm objects, each correlithm object comprising an n-bit digital word of binary values;

the plurality of target value entries comprise a plurality of correlithm objects; and identifying, from the identified subset of the source value entries, a source value entry that matches the first input source value comprises:

determining n-dimensional distances between the first input source value and each source value entry in the identified subset, wherein the determined n-dimensional distances are based on differences between the binary values representing the first input source value and the binary values representing each source value entry in the identified subset; and identifying, from the identified subset of the source value entries, a source value entry with the closest determined n-dimensional distance.

18. The method of claim 17, wherein each of the plurality of target value entries comprises a digital word of binary values having a different number of digits from the n-bit digital word of binary value of a corresponding source value entry.

19. The method of claim 14, wherein:

the first input source value comprises a correlithm object, the correlithm object comprising an n-bit digital word of binary values;

the plurality of source value entries comprise a plurality of correlithm objects, each correlithm object comprising an n-bit digital word of binary values;

the plurality of target value entries comprise a plurality of real world values; and identifying, from the identified subset of the source value entries, a source value entry that matches the first input source value comprises:

determining n-dimensional distances between the first input source value and each source value entry in the identified subset, wherein the determined n-dimensional distances are based on differences between the binary values representing the first input source value and the binary values representing each source value entry in the identified subset; and identifying, from the identified subset of the source value entries, a source value entry with the closest determined n-dimensional distance.

20. The method of claim 14, wherein the closest determined n-dimensional distance comprises a Hamming distance.

* * * * *